Dec. 29, 1931.  T. J. McELLIN  1,838,274
DEVICE FOR PACKING
Filed Aug. 15, 1929    2 Sheets-Sheet 1

T. J. McEllin
INVENTOR

By: Marks & Clerk
Attys.

Dec. 29, 1931.  T. J. McELLIN  1,838,274
DEVICE FOR PACKING
Filed Aug. 15, 1929   2 Sheets-Sheet 2
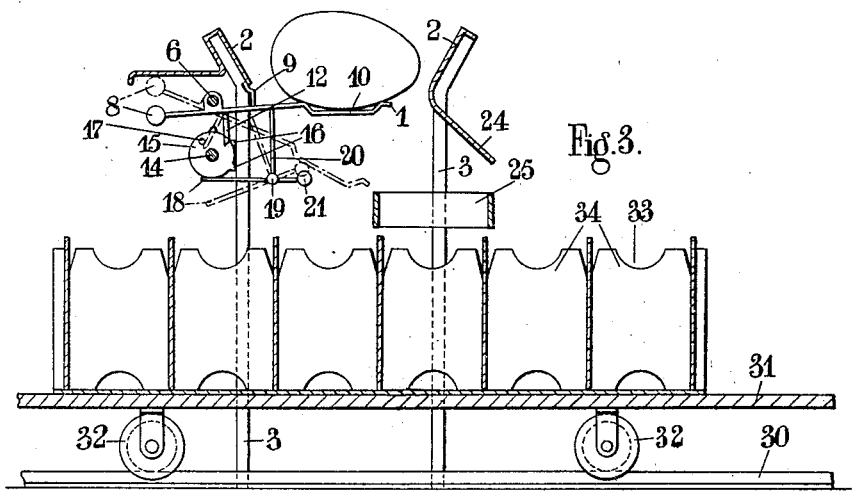
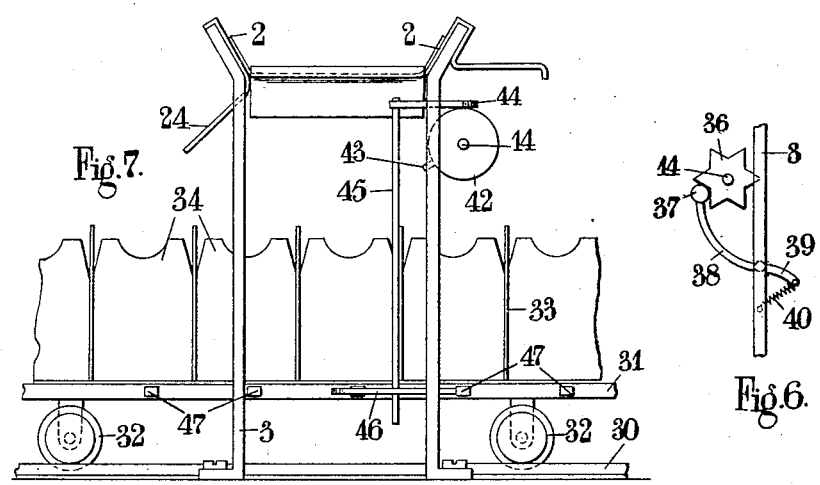
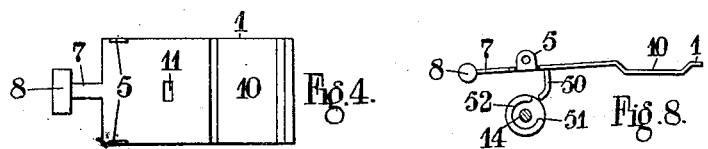
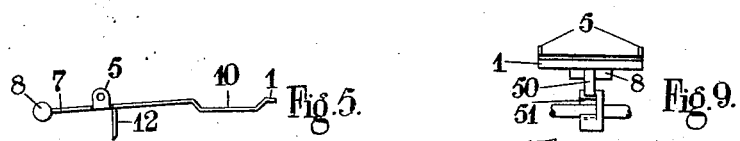
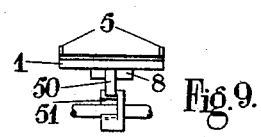
T. J. McEllin
INVENTOR
By Marks & Clerk
Attys.

Patented Dec. 29, 1931

1,838,274

UNITED STATES PATENT OFFICE

THOMAS JOSEPH McELLIN, OF BALLA, IRISH FREE STATE

DEVICE FOR PACKING

Application filed August 15, 1929, Serial No. 386,013, and in the Irish Free State August 27, 1928.

This invention relates to the packing of articles capable of rolling, more particularly eggs.

It is usual when packing eggs for transport to place them either in straw or in sectional boxes having a separate division for each egg. The present invention relates to the latter method and has for its object to facilitate the packing.

The present invention consists in a device for packing articles capable of rolling, more particularly eggs, in which the articles are automatically deposited in each division until the whole section is full.

The invention also consists in the device hereinafter described or indicated.

This invention will now be described, by way of example with reference to the accompanying drawings in which, Figure 1 is an elevation with certain portions removed.

Figure 3 is a section on the line 3—3 of Figure 1.

Figures 4, 5 and 6 are details.

Figure 7 is an end view of Figure 1 looking in the direction of the arrows, and

Figures 8 and 9 are details of a modification.

Figure 1:
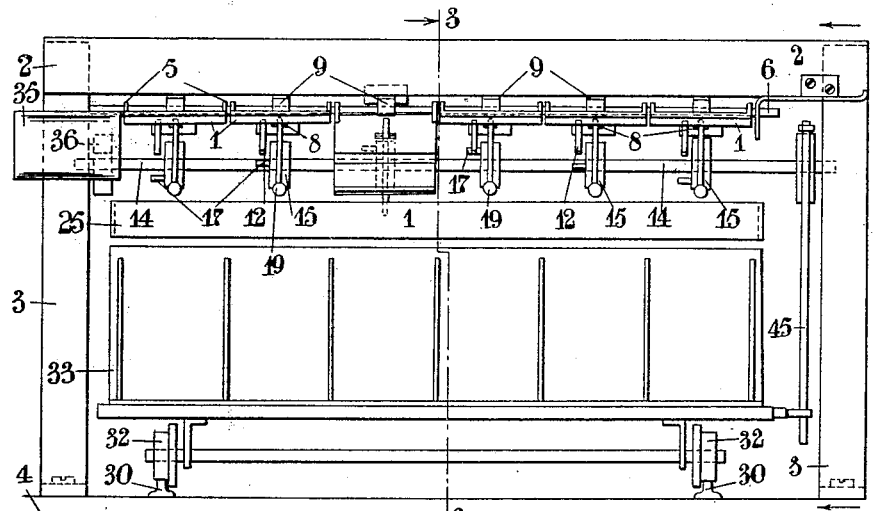

Referring to the figures, a number of trap doors, 1, are provided upon a bridge, 2, 2, mounted upon uprights, 3, 3, secured to a foundation, 4. The trap doors, 1, are preferably formed of stampings or pressings with lugs, 5, 5, (Figs. 4 and 5) which are turned up at right angles to the door and are mounted by means of holes to swing upon the rod, 6, which is secured to the frame of the bridge. Each door is provided with a projection, 7, upon which is mounted a small weight, 8, just sufficiently heavy to keep the door up against the stop, 9, which depends from the side of the bridge, 2, so as to remain horizontal. A depression, 10, is made in each door so as to form rails along which the eggs roll. A hole, 11, and a downwardly projecting finger, 12, are also provided on the trap door. The trap doors, 1, are preferably arranged on a slight incline so that the eggs roll from left to right of Figures 1 and 2.

Mounted upon the upright, 3, 3, or other suitable part of the bridge is a camshaft, 14, having six cams, 15, thereon, one for each door, 1. Each cam is provided with a protuberance, 16, and a pin, 17, projecting in a horizontal direction. Each cam coacts with the horizontal arm, 18, of a bell-crank lever pivoted at, 19, while the vertical arm or locking member, 20, is situated under the door, 1, close to the edge of the hole, 11, and acts as a locking catch to prevent the door from opening. When the member, 20, is moved under the hole, 11, the door can open and the member, 20, will pass through the hole, 11. The arm, 18, is extended beyond the pivot, 19, and provided with a small weight, 21, so that the arm, 17, is always kept gently pressing against the cam, 15.

The sides, 2, are made slanting so as to act as guides should the eggs roll off the track, 10. A further guide plate, 24, is provided on the opposite side to the camshaft to guide the eggs when the trap doors open, into the further guides, 25, each of which has four shallow sides. These guides, 25, are substantially the same size as the division of the sectional box or the like to be filled and are situated exactly over them. They are made of any suitable material either flexible or not as desired.

The foundation, 4, is provided with two rails, 30, 30, on which a platform, 31, can travel by means of flanged wheels, 32. On the platform, 31, is placed the sectional box, 33, or the like having a number of divisions, 34, in rows, each division, 34, being of suitable size to contain one egg.

The end of the bridge from which the eggs are fed is provided with a fixed portion of track, 35.

To one end of the camshaft, 14, is secured a serrated wheel, 36, (Fig. 6) having six indentations in which engages a small roller, 37, mounted upon the arm, 38, of a double ended lever pivoted to one of the uprights, 3. The other arm, 39, is connected to a spring, 40, having its other end anchored to the upright 3.

To the other end of this camshaft, 14, is secured a disc cam, 42, (Fig. 7) having a projection, 43, thereon which engages with the end of the lever, 44, which is fixed upon the shaft, 45, rotatably mounted in suitable bearings on one of the uprights, 3. Secured to the lower end of the shaft, 45, is a double ended lever, 46, which engages with projections, 47, provided upon the platform, 31, the projections being spaced the same distance apart as the rows of divisions. Normally the platform is held from moving from left to right of Figure 3 by means of the end, 48, of the lever, 46. When the camshaft is rotated the projection, 43, will rock the levers, 44, and 46, so that the projection, 47, will just pass the end, 48, but cannot move far since the next adjacent projection, 47, will be caught by the end, 49. Directly the lever, 46, is rocked back the end, 49, will release the projection, 47, and the platform will travel on until the next stop, 47, makes contact with the end, 48. Thus the sectional box is moved transversely one row and an empty row of divisions is brought into position to be filled.

Figure 2:
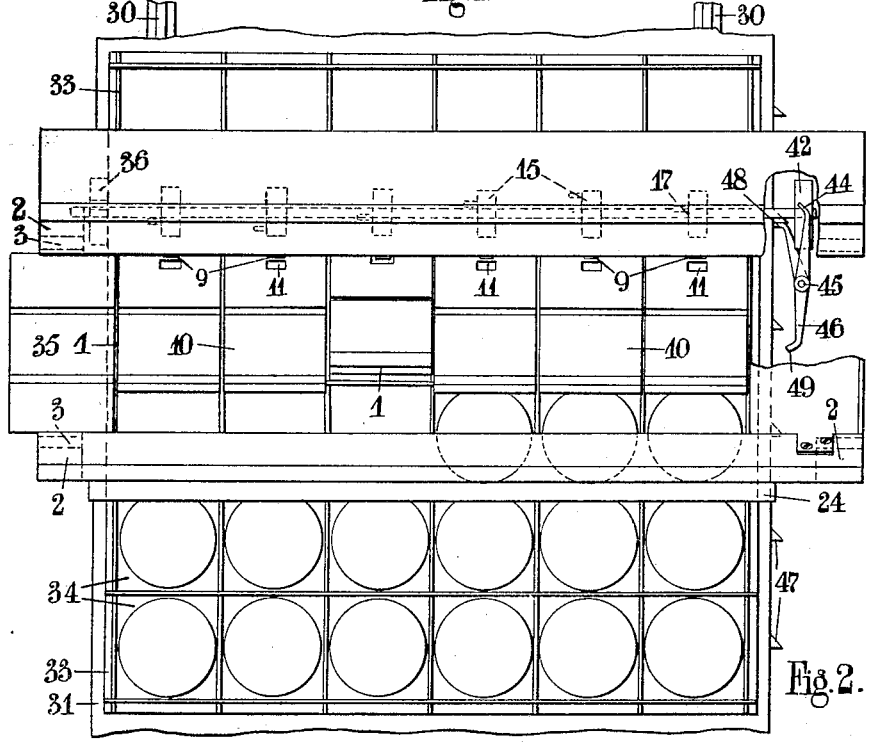
Figure 2 is a plan of Figure 1.

The cams, 15, are so arranged that the trap doors, 1, are unlocked consecutively one after the other commencing with that on the extreme right hand side of Figure 2.

Assuming that the protuberance, 16, on the cam, 15, holds the locking member, 20, under the hole, 11, in the door, 1, on the extreme right of Figure, 2, an egg when rolled along the rails, 10, will pass over all the doors except the last one which it will open and drop into one of the end divisions in the sectional box below. On depression of this door, 1, the projection, 12, will make contact with the pin, 17, on the cam and rotate the camshaft one-sixth of a revolution, the roller, 37, and wheel, 36, holding the camshaft in the correct position so that the next adjacent trap door, 1, is unlocked. The weight, 8, restores the trap door, 1, to the normal position and when in this position the weight, 21, will bring back the locking member, 20, under the door, 1, to lock it. The six doors will thus be unlocked one after the other. After the last egg has been deposited in the row and before the first egg in the next row the platform, 31, is moved so as to bring the next row of the sectional box into the filling position.

The platform, 31, may be moved by means of a spring or a weight, or it may be moved through the action of gravity by arranging the rails, 30, to be on an incline.

Any automatic feed mechanism either hand or mechanically operated may be provided to give a supply of eggs to the device, or the eggs may be fed by hand without and mechanism.

If desired, each cam may have two protuberances, 16, and two pins, 17, so that with six trap doors each door will rotate the camshaft one-twelfth of a revolution. In such a case the cam, 42, will be provided with two projections, 43, instead of one. Although six trap doors, 1, have been illustrated any number may be employed.

Instead of weight for restoring the trap doors and the locking members, 20, springs may be employed.

According to a modification of the invention illustrated in Figures 8 and 9 each trap door, 1, is provided with a curved projection, 50, which engage in a slot, 51, in the periphery of the cam, 52, mounted on the camshaft, 14. When the camshaft is rotated so that the projection, 50, is over the slot, 51, the trap door, 1, is unlocked. The swinging of the trap door, 1, about its hinge, 6, will move the projection, 50, into the slot, 51, so that it comes in contact with its edge and rotates the camshaft to unlock the next adjacent trap door. When the egg has been deposited in the division the trap door will be restored to its horizontal position in which it will be locked on the movement of the next adjacent trap door.

It is to be understood that the arrangement of parts and details of construction may be varied from those hereinbefore described without departing from the scope of the invention.

Having now particularly described and ascertained the nature of my said invention and in what manner the same is to be performed, I declare that what I claim is:—

1. A device for packing into sectional boxes articles capable of rolling comprising in combination a plurality of pivoted trap-doors, and means for unlocking the said trap doors consecutively one after the other.

2. A device for packing into sectional boxes articles capable of rolling comprising in combination a plurality of trap-doors pivoted about a horizontal axis, means for locking said trap-doors, and means operated by said articles to unlock one trap-door at a time.

3. A device for packing into sectional boxes articles capable of rolling comprising in combination a plurality of trap-doors pivoted about a horizontal axis, and means operated by said articles to unlock said trap-doors consecutively one after the other.

4. A device for packing into sectional boxes articles capable of rolling comprising in combination a plurality of trap-doors opening downwardly, and means for locking all the trap-doors except one in the closed position at any one time.

5. A device for packing into sectional boxes articles capable of rolling comprising in combination a plurality of pivoted trap-doors, a box support movable by the said articles, and means for unlocking the said trap-doors consecutively one after the other.

6. A device for packing into sectional boxes articles capable of rolling comprising in combination a movable box support, a number of pivoted trap-doors situated above said box support, and means operated by said articles for unlocking said trap-doors consecutively one after the other.

7. A device for packing into sectional boxes articles capable of rolling comprising in combination a plurality of trap-doors opening downwardly, means for locking all the trap-doors except one in the closed position at any one time, and means operated by the opening of the unlocked trap-door to unlock the next trap-door in sequence.

8. A device for packing into sectional boxes articles capable of rolling comprising in combination a movable box-support, a plurality of trap-doors adapted to be opened by the weight of the articles, means for automatically returning said trap-doors to the closed position, means for locking said trap-doors in the closed position, and means operated by the opening of each trap-door to unlock another trap-door.

9. A device for packing into sectional boxes articles capable of rolling comprising in combination a plurality of trap-doors opening downwards, a cam-shaft, means upon said trap-doors for rotating said cam-shaft, automatic means for locking said trap-doors, means on said cam-shaft for unlocking said trap-doors consecutively one after the other, and a box-support situated below said trap-doors.

10. A device for packing into sectional boxes articles capable of rolling comprising in combination a plurality of trap-doors in a horizontal row adapted to open downwardly, a movable box-support, and means operated by the opening of the last trap-door in a row to permit a force to operate on said box-support to move it.

11. A device for packing into sectional boxes articles capable of rolling comprising in combination a movable box-support, a plurality of trap-doors opening downwardly and arranged in a row, means for locking said trap-doors, means for unlocking said trap-doors consecutively one after the other, and means operated by the last trap-door of the row to permit a force to act on said movable box-support to traverse it.

12. A device for packing into sectional boxes articles capable of rolling comprising in combination a plurality of trap-doors in a horizontal row adapted to open vertically, a box-support movable by gravity, and means operated by the opening of one of said trap-doors to permit gravity to act on said box-support to move it a predetermined amount.

13. A device for packing into sectional boxes articles capable of rolling comprising in combination a support for a sectional box, means for permitting a force to act on said support to move it together with said sectional box one row at a time, a plurality of trap-doors arranged above said sectional box and equal in number to the sections in one row of said box, and means for locking all the trap-doors except one in the closed position at any one time.

14. A device for packing into sectional boxes articles capable of rolling comprising in combination a plurality of trap-doors opening downwardly, means for unlocking the said trap-doors consecutively one after the other, a box-support situated below said trap-doors and movable by gravity, wheels upon which said box-support is mounted, and means actuated by said articles to permit gravity to act on said box-support to move it a predetermined amount.

In testimony whereof I have signed my name to this specification.

THOMAS JOSEPH McELLIN.